May 27, 1947.  E. M. MORROW  2,421,156
SPEED EQUALIZING LANDING WHEEL
Filed Oct. 19, 1943
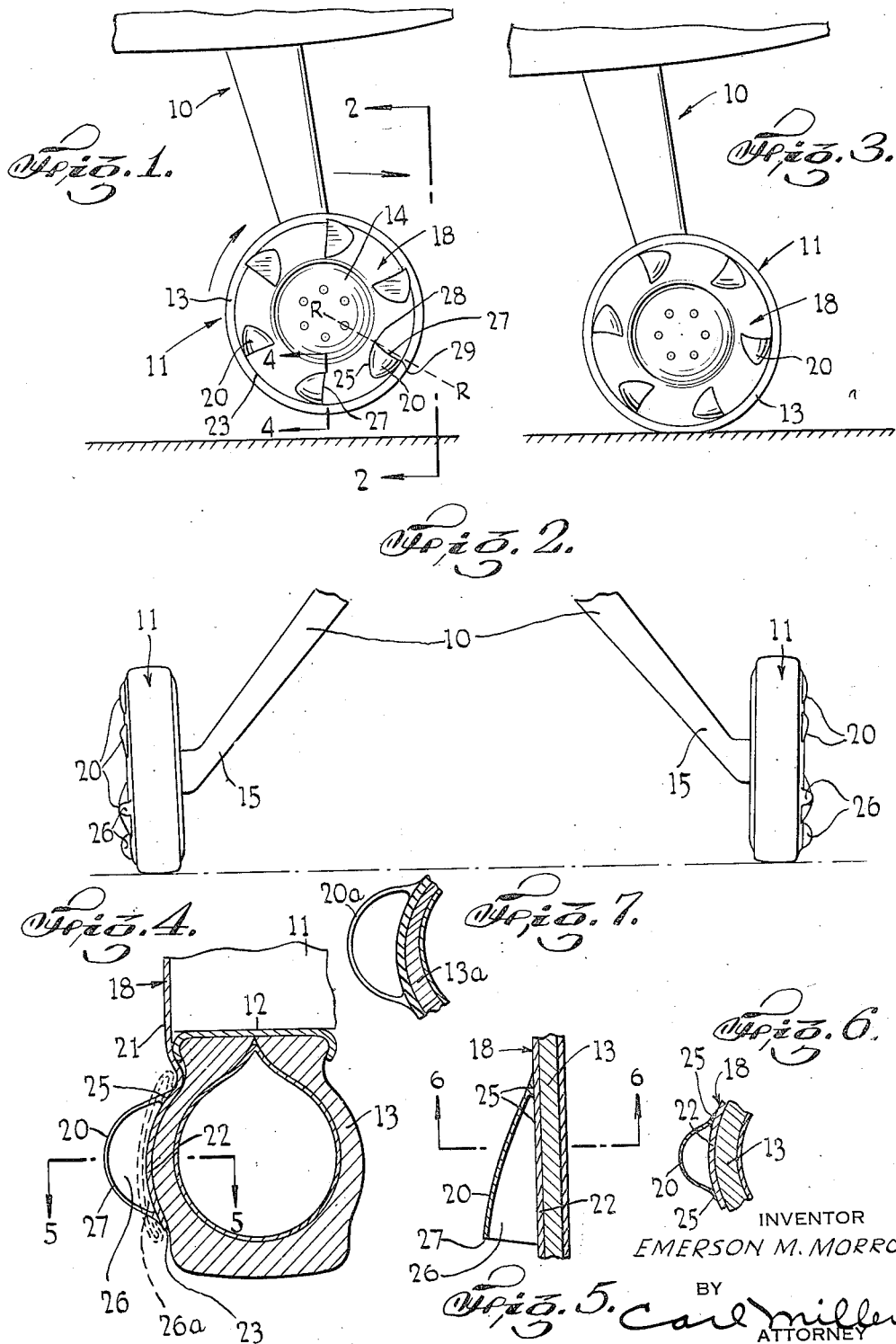
INVENTOR
EMERSON M. MORROW
BY Carl Miller
ATTORNEY Patented May 27, 1947

2,421,156

UNITED STATES PATENT OFFICE 2,421,156

SPEED EQUALIZING LANDING WHEEL

Emerson M. Morrow, Gibsonia, Pa.

Application October 19, 1943, Serial No. 506,810

1 Claim. (Cl. 244—103)

This invention relates to improvements in aeroplane landing gear, and more particularly to the provision of means on the wheels thereon to facilitate the landing of an aeroplane.

One of the biggest obstacles to the life and maintenance of an aeroplane landing gear and tires is the enormous strain resulting from the terrific impact between stationary wheels and landing fields at high landing speeds. This strain would be greatly reduced if the wheels were rotating at a speed corresponding to the landing speed of the plane.

It is accordingly the primary object of this invention to provide means on the wheel or tire whereby the inertia to acceleration of the tire is overcome in the landing of an aeroplane, thus lessening the chance of tilting and overturning in landing and prolonging the life of the tire of the wheel for the reason that it is rotating when it engages the ground.

A further object of this invention is to provide collapsible pockets at the outer sides of the landing wheels or on the outer side walls of the tires adapted to overcome air resistance in such a manner as to cause rotation of the wheels while the aeroplane is in flight.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is a side elevation of an aeroplane landing gear in flight.

Figure 2 is a front elevational view of the landing gear as viewed on line 2—2, Figure 1.

Figure 3 is a view similar to that of Figure 1 showing the landing gear in contact with the ground.

Figure 4 is a detail sectional view taken on line 4—4, Figure 1, showing one of the pockets and its disc mounting.

Figure 5 is a detail sectional view taken on line 5—5, Figure 4.

Figure 6 is a detail sectional view taken on line 6—6, Figure 5.

Figure 7 is a modification showing in detail sectional view similar to that of Figure 4 a pocket fixed to the side wall of a tire.

Referring to the drawing in detail, 10 denotes generally an aeroplane landing gear which may be of the fixed or retractible type carrying a pair of landing wheels 11. The form of wheel 11 shown in Figures 1-6 is of conventional design comprising a rim 12 and pneumatic tire 13, the rim being mounted on a wheel hub 14 receiving the strut axle 15.

To propel the wheels 11 while the aeroplane is in flight, each wheel is provided with a metallic disc 18 having affixed thereto a circumferential row of pockets 20. The disc 18 is formed to provide a wheel mounting portion 21 and a convexly curved radial flange 22 adapted to be engaged by the outer side wall of the tire 13. The disc 18 is rigidly mounted on the wheel by any suitable means (not shown), the exact manner in which this is effected not forming a part of the invention. As will be observed in Figures 1, 3 and 4 the peripheral edge 23 of the disc 18 is disposed well inside of the tread surface of the tire 13 so as not to interfere with the cushioning action and running thereof.

Arranged in a circumferential row on the flange 22 of the disc 18, and equally spaced thereon are the pockets 20. While six such pockets are shown affixed to the disc 18, it is to be understood that this is merely for illustrative purposes only, as the number of pockets, size thereof and spacing may be altered as deemed necessary without in any way departing from the invention. The pockets 20 are preferably formed of rubber, rubberized fabric or any other suitable flexible material, semi-elliptical in shape and preformed to define when distended an ellipsoidal surface when secured to the disc flange 22. The pocket 20 is secured in any desired manner along its peripheral curved edge 25 as by vulcanization (if made of rubber) to the metallic disc. The mouth or open end 26 of the pocket is defined by the edge 27, the pocket 20 being so disposed on the disc flange 22 that the edge 27 is inclined to a radius R, see Figure 1, passing through the inner end 28 of said edge, the outer end 29 being spaced from said radial line. In other words, the open end or mouth 26 of the pocket 20 lies in a plane inclined rearwardly with relation to a radial line passing through the inner end of said mouth.

With the disc 18 and flexible pockets 20 mounted thereon attached to the landing wheels 11, it will be apparent that in flight air will enter the lower pockets 20 positioned with the mouths 26 facing forwardly wholly distending the same to thereby impart rotary movement to the wheels in a clockwise direction. As the wheel rotates and as a pocket is moved to an upper position where the mouth 26 faces rearwardly the pocket will be collapsed due to the air pressure thereon. Thus, the resistance set up by the forwardly facing pockets against the air pressure acting thereagainst will impart the required torque to the wheel to rotate the same, the speed of rotation being proportional to the speed of the aeroplane in the air. It is thus seen that by virtue of the wheels rotating when the same engage the ground that nosing over of the plane is obviated as well as reducing strain and shock on the landing gear and tires.

It is desirable that total collapse of the pockets 20 be obviated as they approach the upper position on the wheel in order that the same may permit ready entry of the air therein as they move downwardly. To this end, each pocket 20 is designed to provide a slight opening 26a at the mouth 26 thereof when collapsed, see dotted lines, Figure 4, thus preventing complete closure of the pocket. By making the flaps automatically collapsible, the efficiency of the device is greatly increased.

Figure 7 illustrates a modification wherein the pocket 20a, similar in all respects to the pocket 20, is secured to the outer side wall of the pneumatic tire 13a carried by the landing gear wheel, the pockets 20a being similarly arranged in a circumferential row thereon. It is to be understood that the disc 18 carrying the pockets 20, as well as the pockets 20a may, if so desired, be placed on the inside of the wheel 11 and tire, respectively.

Having thus described the invention, what is claimed is:

In combination with a landing wheel for aeroplanes equipped with a pneumatic tire, a disc secured to one side of said wheel, a convexly curved radial flange on said disc arranged to be engaged by a side wall of said tire, and a plurality of elongated flexible automatically collapsible open pockets provided in circumferentially spaced relation on said flange, the mouth of each pocket lying in a transverse plane inclined rearwardly with relation to a radius passing through the inner transverse end of said mouth, and each pocket arranged with the long axis thereof extending substantially circumferentially of the disc and tapering to a closed end in the direction of rotation of the wheel when the aeroplane is landing.

EMERSON M. MORROW.

REFERENCES CITED

The following references are of record in the file of this patent:

UNITED STATES PATENTS

| Number | Name | Date |
| --- | --- | --- |
| 1,833,019 | Faucher | Nov. 24, 1931 |
| 2,312,159 | Gulotta | Feb. 23, 1943 |
| 2,305,237 | Carpenter | Dec. 15, 1942 |
| 2,264,923 | Waseige | Dec. 2, 1941 |
| 1,359,180 | Levesque | Nov. 16, 1920 |

FOREIGN PATENTS

| Number | Country | Date |
| --- | --- | --- |
| 516,738 | Great Britain | Jan. 10, 1940 |